United States Patent [19]

Andrews et al.

[11] Patent Number: 4,875,498

[45] Date of Patent: Oct. 24, 1989

[54] IRRIGATION MANAGER SYSTEM WITH ZONE MOISTURE CONTROL

[76] Inventors: T. Arthur Andrews, 1600 E. Lamar Blvd., #112; D. Glenn Gibson, 1908 E. Randol Mill, #208, both of Arlington, Tex. 76011

[21] Appl. No.: 345,902

[22] Filed: May 2, 1989

[51] Int. Cl.⁴ ............................................. A01G 25/16
[52] U.S. Cl. ...................................... 137/78.3; 239/64; 239/70; 137/624.11; 137/624.12; 324/65 P
[58] Field of Search ...................... 137/624.11, 624.12, 137/78.3; 239/64, 70; 324/65 P

[56] References Cited

U.S. PATENT DOCUMENTS

| | | | |
|---|---|---|---|
| 3,777,976 | 12/1973 | Milovancevic | 137/78.3 |
| 4,176,395 | 11/1979 | Evelyn-Veere et al. | 137/624.11 |
| 4,573,114 | 2/1986 | Ferguson et al. | 137/624.11 |
| 4,661,719 | 4/1987 | Burchfiel et al. | 137/624.11 |
| 4,684,920 | 4/1987 | Reiter | 137/78.3 |
| 4,693,419 | 9/1987 | Weintraub et al. | 137/78.3 |
| 4,718,446 | 1/1988 | Simpson | 137/624.11 |
| 4,785,843 | 11/1988 | Nicolson | 137/624.11 |
| 4,796,654 | 1/1989 | Simpson | 137/624.11 |

Primary Examiner—A. Michael Chambers
Attorney, Agent, or Firm—J. Peppers

[57] ABSTRACT

Irrigation controller apparatus for respectively controlling moisture content in a plurality of irrigation zones including an independently actuated moisture detection apparatus in each zone which stops and starts irrigation in that zone depending on moisture detected by the respective apparatus.

17 Claims, 2 Drawing Sheets

IRRIGATION MANAGER SYSTEM WITH ZONE MOISTURE CONTROL

FIELD OF INVENTION

This invention generally pertains to land irrigating systems such as sprinkler irrigation systems and drip irrigation systems.

More particularly, the invention pertains to irrigating systems having a plurality of irrigating zones with each zone including a plurality of irrigating stations. The zones may be commonly controlled for irrigating time, permitted irrigation temperatures, permitted light intensity, and the like. Each respective zone is further controlled to permit irrigation only when the respective irrigated earth has less than a prescribed moisture content.

BACKGROUND OF THE INVENTION

Dry earth is electrically non-conductive to the extent of being a good electrical insulator. As moisture is added, the earth will become more conductive until it is water-saturated. When saturated, the earth is then highly conductive. The earth's conductivity can be measured and becomes the basis for the moisture control system of the present invention.

When the moisture control of an extensive plot of land is effected by a single control unit, some of the land may be inadequately irrigated while other parts of the plot may be overirrigated and undesirably saturated with water. The present invention provides appropriate irrigation for a plurality of different zones where each zone is irrigated only to the extent as needed.

The presently known prior art consists of the following U.S. Pat. Nos.: 3,823,874; 3,892,982; 3,961,753; 4,014,359; 4,122,389; 4,246,574; 4,256,133; 4,268,824; 4,304,989; 4,514,722; 4,545,396; 4,548,225; 4,646,224; 4,657,039; 4,683,904; 4,684,920; and 4,693,419.

OBJECTS OF THE INVENTION

An important object of the present invention is to independently control or manage the moisture content of the respective zones included in an irrigated plot of land where the irrigation requirements may differ substantially between individual zones.

Another object of the present invention is operate a total irrigation system including several individual zones for sufficient time to adequately irrigate a zone needing the most irrigation with assurance that the remaining zones are not excessively irrigated with resultant waste of water or possible plant damage.

A further object of the present invention is to prevent the respective zones of an irrigated plot from being irrigated when natural rainfall has provided sufficient moisture for each zone.

Yet another object of the present invention is to optionally provide an override to the moisture controller in each designated zone to turn on the sprinklers of the zone at any time.

SUMMARY OF THE INVENTION

Further objects and advantages of the present invention are attained by a moisture controller or manager apparatus adapted to independently manage the amount of moisture in respective zones of earth included within a plot of land wherein the respective zones may require a different amount of irrigating water, a different length of irrigating time, and a different number of irrigating stations. The apparatus includes an integral and monolithic waterproof electrical earth-resistance detection body adapted for installation below the surface of the ground with the body being hermetically sealed against intrusion of liquids or air.

The detection body has two electrical detection electrodes mounted to extend out of the body for intimate contact with the earth surrounding the body. The body has a first pair of electrical input connectors adapted for connection to receive AC electrical power from a central controller also operating to control other units of the apparatus in other respective zones. The body has a second pair of electrical output connectors adapted for connection to supply AC electrical current to solenoid actuated irrigating valves. The body contains an integrated bi-polar resistance detection circuit mounted on a printed circuit base and connected to the detection electrodes and the input connectors. The detection circuit is adapted to oscillate at frequencies governed by a fixed reference resistance and a varying resistance detected through earth located between the detection electrodes. The detected resistance varies as a function of water present in the earth. The electrical current impressed between the detection electrodes is alternating current. The body contains a remotely actuated switch relay mounted on the circuit base and connected to the detection circuit. The relay is operative in response to the output of the detection circuit to open and to close the switch connected between the electrical input connectors and the electrical output connectors.

The detection body is formed of a heat-hardenable, liquid plastic poured in and around the detection electrodes, the input connectors, the output connectors, the integrated circuit components and the relay components wherein the liquid plastic is hardened in place to an integral and monolithic solid body. A metal shield may be mounted with the printed circuit base as a common ground connection, for example, and adapted to shield the circuit compnents against spurious external wave energy.

A central controller mounted remote from the body is operable to transmit AC electrical power to the input connectors responsive to switches mounted in the central controller. The controller switches may be respectively a time switch and/or a low temperature switch. Another switch may be actuated in response to a light sensing circuit. The detection electrodes are made of a non-corrosive material.

One of the detection electrodes, one of the input connectors, one of the output connectors, the integrated circuit, and the relay switch are respectively connected to a common ground return. The relay switch may be separately connected to a third input connector and adapted to receive a separate AC power voltage from the central controller through a manual override switch located with the central controller. The electrical output connectors may be respectively connected to a plurality of solenoid valves. Each of the solenoid valves may be respectively connected to a plurality of irrigating heads. The irrigating heads may be sprinkler heads or drip irrigation heads.

DESCRIPTION OF THE PREFERRED EMBODIMENT

Figure 1:
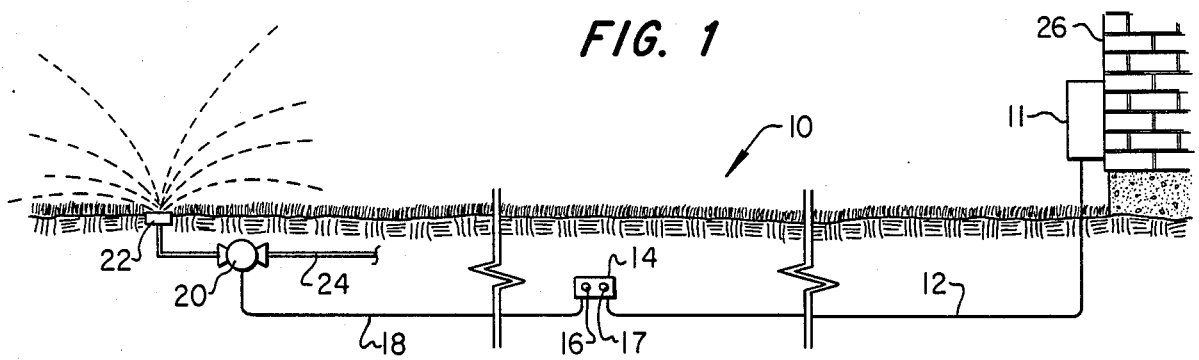
FIG. 1 is a schematic illustration of an elevational view showing one zone of an exemplary irrigation plot.
Figure 2:
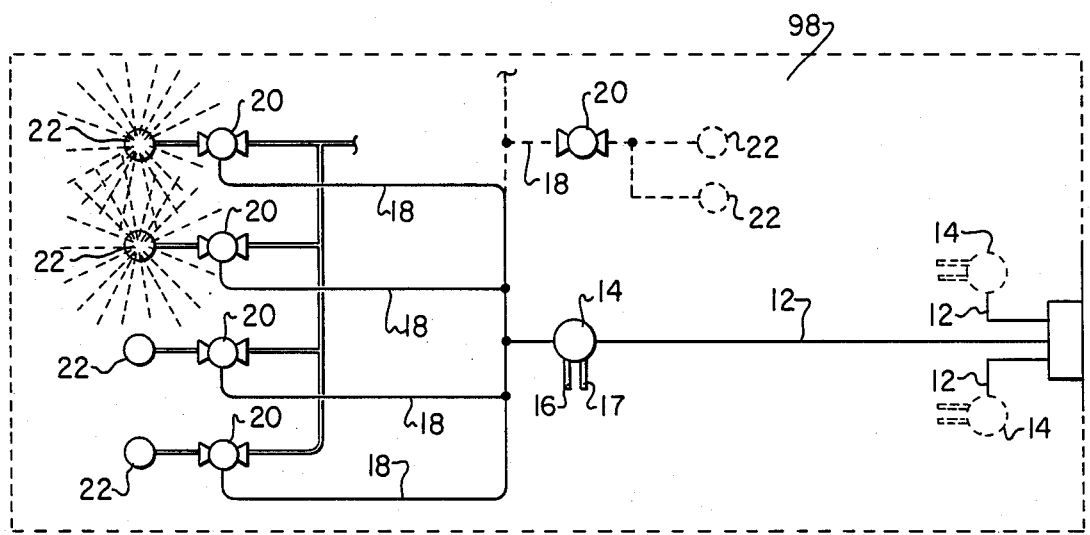
FIG. 2 is a schematic illustration showing the plan view of the irrigation zone shown in FIG. 1.
Figure 3:
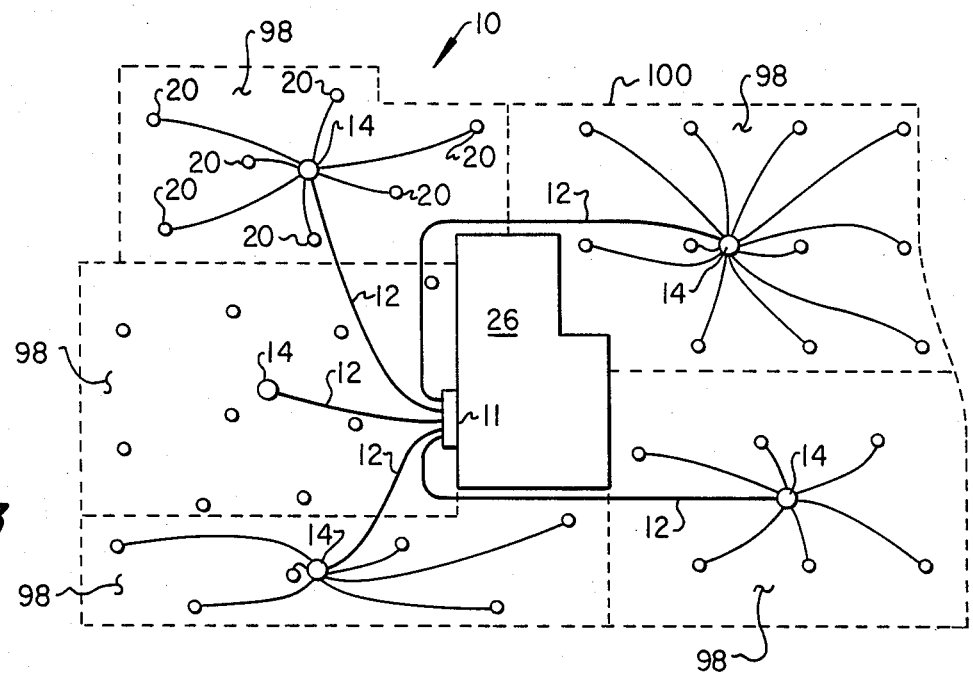
FIG. 3 is a schematic illustration showing an overall plot of land to be irrigated as divided into a plurality of irrigating zones.

FIGS. 1-3 schematically illustrate a plot of irrigated land having several irrigation zones. FIG. 1 shows an elevation of plot of land 10 in which the various components of irrigation apparatus are installed. As seen in FIGS. 1-3, a central controller 11 is disposed adjacnt to a building 26 and has a plurality of cables 12 extending outwardly to a respective soil resistance detection control probe 14, and into a plurality of conductors 18 respectively connected into flow control devices such as solenoid valves 20. Each of the valves 20 are further connected into one or more irrigating heads 22 which may be sprinkler heads as illustrated.

Each detection probe 14 is buried within the earth at approximately the lowest depth that the roots of plants are expected to reach in a particular type of soil. Such plants may be grass such as in a lawn, municipal park, or golf course, for example. In other installations the plants might be grape vines or fruit trees, for example.

The probe 14 has two resistance detection probes 16 and 17 which are embedded in the earth where the probe 14 is installed.

Each of the solenoid valves 20 control the flow of water through a conduit 24, for example. The solenoids 20 may control the flow of water to individual heads 22 as shown or a multiplicity of heads 22 as shown in dashed lines in FIG. 2. Also shown in FIG. 2 is other detection probes 14 extending through power cables 12 from central controller 11.

FIG. 3 shows a plot of land 100 surrounding a building 26 which represents a residence, business building, or the like. A number f irrigation zones 98 are defined in the land plot 100, and a power cable 12 terminating in one or more detection probes 14 is installed in each of these plots. As also shown, a plurality of control cables 18 extend outwardly from each detection probe 14 and are respectively connected into solenoid valves 20. One or more irrigating heads or stations 22 (not shown) extend from each of the solenoid valves 20.

The central controller 11 actuates all the power cables 12 and resistance probes 14 as shown. The central controller 11 may be actuated to turn the system off and on by means of a timer switch, a temperature or freeze switch, and possibly a light responsive switch (not shown). In this manner the controller 11 will control power to the system for certain periods of each day, each week, or the like. The controller will also be responsive to irrigate the plot 100 only during evening and night hours, if desired, by a light sensitive switch.

The system can also be regulated to be operable only during above freezing temperatures.

When the earth in the vicinity of the electrodes 16 and 17 of detection probe 14 is dry, then the resistance measured between the probes 16 and 17 is very high with a relatively large voltage occurring between the electrodes. As the ground is moisturized, the earth between the electrodes 16 and 17 becomes less resistive and the voltage occurring across the electrodes is gradually lessened as the moisture increases. At a pre-determined voltage level, the detection probe 14 is actuated to open an internal switch and turn off the solenoids 20 as shown in FIGS. 1-3.

To curtail water demand at a designated time, the controller 11 may be equipped with sequencing switches (not shown) to sequentially activate the control probes 14 in any combination. Since all the switches for controller 11 are commercially available, there is no need to describe or show such switches specifically.

Figure 8:
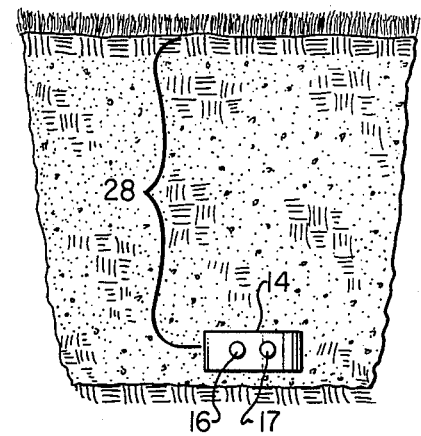
FIG. 8 is a cross-sectional view of a typical detection probe installed within the earth at a depth 28.

FIG. 8 shows a typical detection probe 14 installed within the earth at a depth 28 which, as illustrated, is approximately the lower depth that the grass roots will extend.

Figure 4:
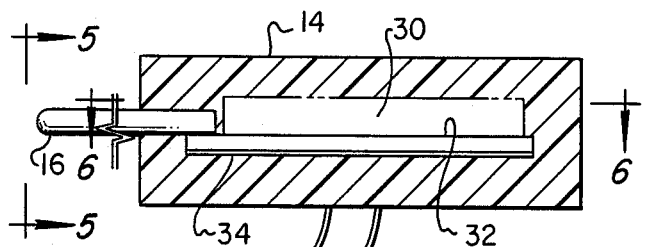
FIG. 4 is a cross-sectional view taken at 4—4 of FIG. 6. and schematically showing the detection apparatus including the resistance detection circuits.
Figure 5:
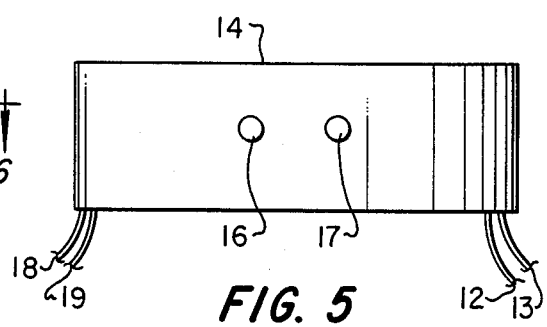
FIG. 5 is an elevational view taken at 5—5 of FIG. 4 and showing the resistance detection electrodes.
Figure 6:
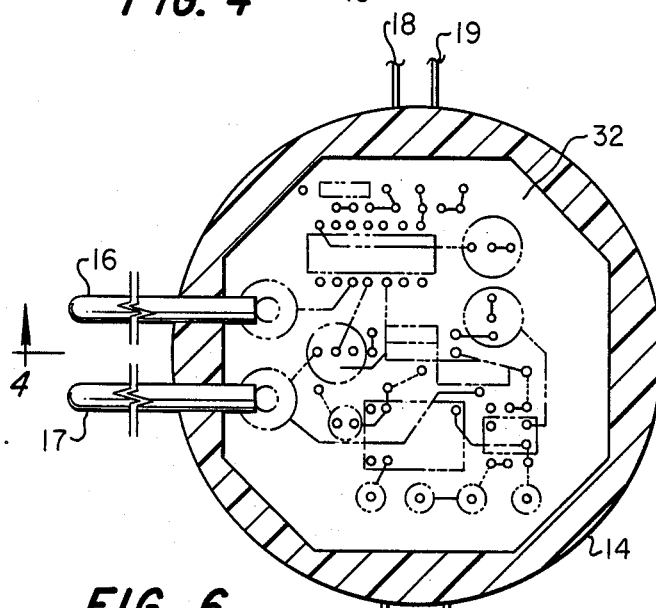
FIG. 6 is a cross-sectional view showing the detection apparatus as taken along the line 6—6 of FIG. 4 and schematically showing the circuit and circuit board of the detection circuit.

The physical structure of the detection probe 14 is schematically illustrated in FIGS. 4-6. FIG. 4 shows an elevational section of the probe 14. As seen in FIGS. 4-6, the probe 14 is seen to have detection probes 16 and 17 extending in parallel out the side of the probe 14 at a designated distance apart, with one inch between the inner edges being an example. Mounted within the probe 14 are the electronic components 30 of the detection and actuating circuit mounted on a circuit board 32. The circuit board 32 may be plated for circuit printing on one side and with a solid conductive sheet 34 on the other side. As shown in FIG. 6, the circuit components may be mounted on one side of the circuit board 32. In FIG. 4 the plating of the circuit board 32 may be a shield 34 for the purpose of shielding the circuit against unwanted radiation such as emanating from high tension power lines, etc.

In the manufacture of the probe 14, the components 16, 17, 30, 32, and 34 are disposed in a casting mold (not shown) in the position as shown in FIG. 4 and FIG. 6. A heat-hardenable resin of relatively low viscosity is thereon poured in and around the circuit board and circuit components in a manner eliminating any trapped air such that the liquid plastic is in close and intimate contact with all the respective components of the probe 14. The plastic is then allowed to harden into a solid monolithic structure which is hermetic and impervious to liquid or gas intrusion. The hardening time of the epoxy resin may vary from only a few minutes to several hours, depending on the respective formula of the epoxy employed. The resulting body and internals of the probe 14 is an integral and monolithic mass.

An epoxy resin is presently being used as the preferred plastic for the probe 14. However, other plastics such as "Nylon", acrylic, and polyvinyl chloride may be employed if tailored to this particular application.

Figure 7:
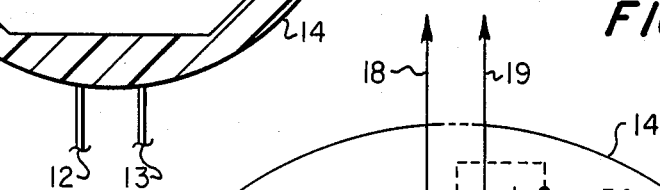
FIG. 7 is a plan view somewhat similar to FIG. 6 and schematically showing the resistance detection and switching circuits of the present invention.

FIG. 7 is a schematic illustration of the detection and actuating circuit of the probe 14. As shown, the circuit is seen to include generally a detection circuit component which actuates a relay switch component. A common ground connection 48 is seen to electrically extend through the probe 14 from the power cable conductor 12 to the controller conductor 18. Detection electrode 17 is connected into this ground. This common ground may also be the shield plate 34 as shown in FIG. 4 and previously described.

The detection portion of this circuit may be adapted from several integrated detection circuits commercially available. Examples of such suppliers are SGS-Semiconductor Corporation, Phoenix, Ariz. 85022; Sprague Electric Company, Lexington, Mass. 02173; and National Semiconductor Corporation, Santa Clara, Calif. 95051.

SGS-Semiconductor Corporation supplies an integrated detection circuit Model No. 4620, for example. Sprague Electric Company manufactures an integrated detection circuit Model No. ULN-2429A, for example. National Semiconductor Corporation manufactures detection circuits Model Nos. LM1042, LM903, and LM1830, as examples.

Of the above integrated detection circuits, the National Semiconductor Corporation's detector circuit Model No. LM1830 is the circuit considered to be preferred when modified for use in the present invention. This LM1830 fluid detector circuit is advertised for use in the fluid detection systems utilized in automotive and industrial equipment. An automobile radiator liquid lel detector is an example.

There is shown an oscillator circuit 38 for providing a varied frequency voltage to energize the probes 16 and 17. The frequency of the oscillator circuit 38 is set by the value of a timing capacitor 56. A detector circuit 36 is provided in connection between the electrodes 16 and 17 to detect the voltage appearing across electrodes 16 and 17 and creates an activating voltage to activate the relay driver 40 when a designated voltage across detector 36 is reached. The capacitor 58, connected between the detector 36 and ground, is provided to filter the output to the relay driver 40 to prevent relay chatter.

The oscillator 38 is coupled to the sensing electrode 16 through a capacitor 60 and a fixed resistance 61. The total resistance seen by oscillator 38 is the resistance of the earth seen between probes 16 and 17 in series with the fixed resistor 61. Thus, the resistance is a function of the fixed resistor 61, the earth's resistivity, the length and diameter of the probes, and the spacing between the probes. The value of the resistor 61 is used to calibrate the sensitivity of the system.

The output of the detector 36 is a function of the earth's resistance between the electrodes 16 and 17, and this output is sent to the relay driver 40. At a pre-determined voltage level, the relay driver 40 sends an actuating voltage to the switch relay 42 which actuates the contacts of switch 54. The switch relay 42 with the switch 54 may be of a mechanical solenoid type as illustrated, or a solid state device (not shown).

A DC bias supply circuit 44 supplies a DC bias voltage to the oscillator 38, the detector 36, and the relay driver 40. An AC/DC bridge circuit 46 connected between the ground 48 and a voltage supply circuit 50 is energized to supply a DC voltage to the switch relay 42.

When the relay 42 is driven by the output of the relay driver 40, an internal resistor in relay 42 provides a voltage drop to reduce unnecessary heating of the relay. A diode and capacitor in relay 42 provide additional delay for the opening of the relay. Because the voltage necessary to close the relay 42 is much higher than the release voltage, there exists a hysteresis that prevents the tendency of the relay 42 to chatter when activated or de-activated. The AC/DC bridge 46 supplies energizing voltage to relay switch 42.

When relay 42 is activated, the relay contacts of switch 52 close and apply 28 volts AC, for example, to the solenoid 20 as shown in FIG. 1 and FIG. 2. Actuation of the solenoids 20 opens the valve to permit water to flow to the irrigating heads 22.

In operation, the circuit of probe 14 is energized when voltage is received from the controller 11. When probe 14 is energized, the probe supplies electrical voltage to the solenoids 20 when the earth's resistance across detection electrodes 16 and 17 indicate insufficient water in the earth between the electrodes.

When the resistance of the earth between the electrodes 16 and 17 decreases to a pre-determined level, then the switch relay opens the circuit between the conductors 19 and 13 and allows the solenoids 20 to become de-energized.

An optional feature which may be employed in the probe 14 is an override control conductor 52 which will connect through the switch 54 and energize the solenoids 20 even though the switch is disconnected in the regular connection through the conductor 50 from the conductor 13 to conductor 19. This override wire or conductor 52 may be part of the power cable coming out to the detection probe 14 from the controller 11.

This override feature is useful in that an operator can close the override switch at the central controller 11 and thereby energize all the solenoid valves in the system. Thus, all the irrigating heads in the system will be seen to sprinkle, indicating that all the respective probes 14 are operational and receiving voltage from the central controller.

It will become apparent to those skilled in the art that the preferred embodiment as herein disclosed may be modified substantially without departing from the spirit of the invention as defined by the appended claims.

What is claimed:

1. Moisture manager apparatus for independently managing the amount of moisture in respective zones of earth included within a plot of land being irrigated, said apparatus comprising:
   (a) a monolithic electrical earth resistance detection body installed within the earth in a designated zone, said body being hermetically sealed against intrusion of liquids and air;
   (b) said body having two electrical detection electrodes mounted to extend out of said body into intimate contact within the earth;
   (c) said body having a first pair of electrical input connectors connected to receive AC electrical power from a central controller connected to control other said bodies in other said designated zones;
   (d) said body having a second pair of electrical output connectors connected to supply electrical AC voltage to irrigating valve means;
   (e) said body including a bipolar electrical resistance detection circuit means mounted on a printed circuit base and connected to said detection electrodes and to said input connectors, said detection circuit means being adapted to oscillate at frequencies governed by a fixed reference resistor and a varying resistance detected through the earth between said detection electrodes, said varying resistance being a function of water present in said earth;
   (f) said body containing a switch relay means mounted on said base and connected to said integrated circuit and operative in response to the output of said detection circuit to open and to close said switch relay;

(g) said body being formed of a heat-hardenable liquid plastic poured in and around said detection electrodes, said input connectors, said output connectors, said integrated circuit, and said switch relay wherein the liquid plastic becomes hardened in place into an integral and monolithic solid body.

2. The apparatus of claim 1 wherein said central controller is operable to transmit AC electrical power to said input connectors responsive to switches mounted in said central controller, said switches being respectively opened and closed in response to a timing switch means.

3. The apparatus of claim 2 further including a metal shield mounted with said printed circuit base and adapted to shield said integrated circuit and said switch relay means against spurious external wave energy, said shield being connected to a common ground.

4. The apparatus of claim 2 wherein one switch of said switches is also a temperature sensing switch.

5. The apparatus of claim 2 wherein one switch of said switches is actuated in response to a light sensing means.

6. The apparatus of claim 1 wherein one of said detection electrodes, one of said input connectors, one of said output connectors, said integrated circuit, and said switch relay are connected to a common ground return.

7. The apparatus of claim 1 wherein said switch relay means is separately connected to a third input connector to receive a separate AC power voltage from said central controller through a manual override switch means.

8. The apparatus of claim 1 wherein said electrical output connectors are respectively connected to a plurality of solenoid valves.

9. Moisture detection apparatus for detecting the amount of moisture in the earth at a designated depth, said apparatus comprising:

(a) a monolithic and integral detection body adapted for installation below the surface of the earth, said body being hermetically sealed against intrusion of liquids and air;

(b) said body having two electrical resistance detection electrodes mounted to extend out of said body for intimate contact with earth enclosing said body;

(c) said body having a first pair of electrical input connectors adapted for connection to receive AC electrical power;

(d) said body having a second pair of electrical output connectors adapted to supply AC electrical power;

(e) said body including a bipolar electrical resistance detection circuit means mounted on a printed circuit base and connected to said detection electrodes and to said input connectors, said detection circuit means being adapted to oscillate at frequencies governed by a fixed reference resistance and a varying external resistance detected between said detection electrodes, said external resistance being varied as a function of the amount of moisture present in said earth;

(f) said body including a switch relay means connected to said resistance detection circuit and operative in response to a designated voltage occurring across said detection electrodes to open and to close a switch connected between said electrical input connectors and said output connectors; and (g) said body being formed of a heat-hardenable liquid plastic poured in and around said detection electrodes, said input connectors, said output connectors, said detection circuit, and said switch means wherein the liquid plastic is hardened in place into an integral and monolithic solid body.

10. The apparatus of claim 9 wherein one of said detection electrodes, one of said input connectors, one of said output connectors, said integrated circuit, and said switch relay means are respectively connected to a common ground return.

11. The apparatus of claim 9 further including a metal shield mounted with said printed circuit base and adapted to shield said integrated circuit and said switch relay means against spurious external wave energy.

12. The apparatus of claim 9 wherein said switch is separately connected to a third input connector and adapted to receive a separate AC power voltage from said central controller through a manual override switch.

13. The apparatus of claim 9 wherein said switch relay means is a solenoid switch.

14. Moisture manager apparatus designed to independently control the amount of moisture in each respective zone of earth included within a plot of land wherein the various zones may require a different amount of irrigation, said apparatus comprising:

(a) a monolithic electrical soil resistance detection probe adapted for installation below the surface of the earth with said probe being sealed against intrusion of liquid and air;

(b) said probe having two electrical detection electrodes mounted to extend out of said probe for intimate contact with earth surrounding said body;

(c) said probe having a first pair of electrical input connectors adapted for connection to receive AC electrical power from a central controller operating to control other said probes in other said zones;

(d) said probe having a second pair of electrical output connectors adapted for connection to supply AC electrical current to irrigating valve means;

(e) said probe containing an integrated electrical resistance detection circuit mounted on a printed circuit base and connected to said detection electrodes, to said input connectors and said output connectors, said detection circuit being adapted to oscillate at varying frequencies governed by a fixed reference resistor and a varying external resistance detected between said detection electrodes, said external resistance being varied as a function of water present in said earth;

(f) said probe containing a switch relay means mounted on said base, connected to said detection circuit, and operative in response to the output of said detection circuit to open and to close a switch as connected between said electrical input connectors and said electrical output connectors; and (g) said body being formed of a heat-hardenable liquid plastic poured in and around said detection electrodes, said input connectors, said output connectors, said integrated circuit, and said switch relay wherein said liquid plastic is hardened in place to an integral and monolithic solid body.

15. The apparatus of claim 14 further including a metal shield mounted with said printed circuit base and adapted to shield said detection circuit and said switch relay against spurious external wave energy.

16. The apparatus of claim 14 wherein one of said detection electrodes, one of said input connectors, one of said output connectors, said integrated circuit, and said switch relay are respectively connected to a common ground return.

17. The apparatus of claim 14 wherein said switch relay means is further connected to a third input connector and adapted to receive a separate power voltage from said central controller through a manual override switch means.

* * * * *